(12) United States Patent
Einecke et al.

(10) Patent No.: US 9,313,462 B2
(45) Date of Patent: Apr. 12, 2016

(54) VEHICLE WITH IMPROVED TRAFFIC-OBJECT POSITION DETECTION USING SYMMETRIC SEARCH

(71) Applicant: HONDA MOTOR CO., LTD., Tokyo (JP)

(72) Inventors: Nils Einecke, Offenbach (DE); Sven Rebhan, Offenbach (DE); Morimichi Nishigaki, Offenbach (DE)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 13/799,338

(22) Filed: Mar. 13, 2013

(65) Prior Publication Data

US 2013/0335569 A1    Dec. 19, 2013

(30) Foreign Application Priority Data

Mar. 14, 2012   (EP) .................................. 12159423

(51) Int. Cl.
*H04N 7/18* (2006.01)
*G01S 13/86* (2006.01)
(Continued)

(52) U.S. Cl.
CPC *H04N 7/18* (2013.01); *G01S 13/58* (2013.01); *G01S 13/726* (2013.01); *G01S 13/867* (2013.01); *G01S 13/931* (2013.01); *G06K 9/00805* (2013.01); *G06K 9/00825* (2013.01); *G08G 1/166* (2013.01); *G01S 7/2955* (2013.01); *G01S 13/42* (2013.01); *G01S 2013/9353* (2013.01);
(Continued)

(58) Field of Classification Search
CPC ..... G01S 13/867; G01S 7/2955; G01S 13/42; G01S 13/58; G01S 13/726; G01S 2013/9353; G01S 2013/9375; G01S 2013/9367; G01S 13/931; G01S 2013/9364; G08G 1/166; G06K 9/00825; G06K 9/00805; H04N 7/18
See application file for complete search history.

(56) References Cited

U.S. PATENT DOCUMENTS 6,570,840 B1 * 5/2003 Wilkinson et al. ......... 369/275.4
6,590,521 B1   7/2003 Saka et al.
(Continued)

FOREIGN PATENT DOCUMENTS

AT          501882 A1     12/2006
EP         2386998 A1     11/2011
WO   WO 03/001472 A1      1/2003

OTHER PUBLICATIONS

Nils Einecke et al., "A Two-Stage Correlation Method for Stereoscopic Depth Estimation", Proceedings of the International Conference of Digital Image Computing; Techniques and Applications (DICTA), pp. 227-234, 2010.
(Continued)

*Primary Examiner* — Jay Patel
*Assistant Examiner* — Joseph Suh
(74) *Attorney, Agent, or Firm* — Squire Patton Boggs (US) LLP

(57) ABSTRACT

A method for detecting the position of a target object in the environment of a host vehicle. The method may include receiving a first position of the target object as detected by an object position sensor which emits waves and receives the waves that are reflected back by the target object, and receiving an image containing the target object as detected by an image sensor. The method may also include projecting the first position on the image, and refining the first position by computing a second refined position of the target object on the basis of a symmetry search within the image.

22 Claims, 6 Drawing Sheets

(51) Int. Cl.
  *G08G 1/16* (2006.01)
  *G01S 13/58* (2006.01)
  *G01S 13/72* (2006.01)
  *G01S 13/93* (2006.01)
  *G06K 9/00* (2006.01)
  *G01S 7/295* (2006.01)
  *G01S 13/42* (2006.01)

(52) U.S. Cl.
  CPC . *G01S 2013/9364* (2013.01); *G01S 2013/9367* (2013.01); *G01S 2013/9375* (2013.01)

(56) References Cited

U.S. PATENT DOCUMENTS

| | | | | |
|---|---|---|---|---|
| 2002/0062204 | A1* | 5/2002 | Nakajima | 702/150 |
| 2002/0146155 | A1* | 10/2002 | Mil'shtein et al. | 382/115 |
| 2002/0164077 | A1* | 11/2002 | Lee et al. | 382/224 |
| 2003/0026326 | A1* | 2/2003 | Jayaraman et al. | 375/148 |
| 2003/0091157 | A1* | 5/2003 | Nakanishi et al. | 378/205 |
| 2003/0173127 | A1* | 9/2003 | Noecker | 180/167 |
| 2004/0109599 | A1* | 6/2004 | Cho et al. | 382/145 |
| 2004/0178945 | A1 | 9/2004 | Buchanan | |
| 2004/0195490 | A1* | 10/2004 | Sugiyama et al. | 250/208.1 |
| 2004/0240753 | A1* | 12/2004 | Hu et al. | 382/286 |
| 2005/0128197 | A1* | 6/2005 | Thrun et al. | 345/421 |
| 2006/0126916 | A1* | 6/2006 | Kokumai | 382/151 |
| 2007/0075892 | A1* | 4/2007 | Horibe | 342/70 |
| 2007/0274584 | A1* | 11/2007 | Leow et al. | 382/132 |
| 2009/0040532 | A1* | 2/2009 | Kawasaki et al. | 356/610 |
| 2009/0082474 | A1* | 3/2009 | Zhang et al. | 516/32 |
| 2009/0123048 | A1* | 5/2009 | Leroux et al. | 382/131 |
| 2009/0135065 | A1* | 5/2009 | Tsuchida et al. | 342/454 |
| 2009/0322742 | A1* | 12/2009 | Muktinutalapati et al. | 345/420 |
| 2010/0141508 | A1* | 6/2010 | Nguyen et al. | 342/25 F |
| 2010/0256840 | A1* | 10/2010 | Call et al. | 701/17 |
| 2011/0012778 | A1* | 1/2011 | Nguyen et al. | 342/25 A |
| 2011/0292166 | A1* | 12/2011 | Schall et al. | 348/37 |
| 2012/0140061 | A1* | 6/2012 | Zeng | 348/135 |
| 2012/0286989 | A1* | 11/2012 | Sathyendra et al. | 342/25 F |

OTHER PUBLICATIONS

European Search Report dated Jul. 23, 2012 corresponding to European Patent Application No. 12159423.8.

R. E. Kalman, "A New Approach to Linear Filtering and Prediction Problems," Transactions of the ASME—Journal of Basic Engineering, 82 (Series D), pp. 35-45, 1960.

Ramin Zabih et al., "Non-Parametric Local Transforms for Computing Visual Correspondence," In Proceedings of European Conference on Computer Vision, Stockholm Sweden, May 1994, pp. 151-158.

* cited by examiner

VEHICLE WITH IMPROVED TRAFFIC-OBJECT POSITION DETECTION USING SYMMETRIC SEARCH

BACKGROUND

1. Field

The present invention is related to the field of computer vision for vehicles, and particularly automatic object detection in the automotive domain. ("Automotive" equally applies to any land, air or sea vehicle). More precisely, the invention belongs to the domain of driver assistance systems.

2. Description of the Related Art

It is known that object position detection systems with a radar sensor and mounted on a host vehicle may detect other vehicles in the vicinity of a host vehicle and may return information like the lateral and longitudinal position of those vehicles. "Vicinity" is the area around the host vehicle which is covered by one or more sensors of the host vehicle. Due to the manner the radar sensor measures this information, the lateral component of the position may be very inaccurate and can vary in the range of a vehicle width. For most applications a more precise estimation of the lateral position is thus required. "Position" is the position of the object in the input field of the sensor(s) relative to the position of the host vehicle.

Existing systems integrate the measured positions over time using e.g. a Kalman filter, creating the problem of an increased latency between the actual lateral position of the vehicle and the position estimated by such a system. However such an increased latency is a disadvantage especially for applications relying on lateral movements.

Document U.S. Pat. No. 6,590,521 B1 describes an object recognition system in a car. The system consists of a radar detection for coarse detection for which then the outline of the detected vehicle is determined by means of an edge detection. Furthermore, lane detection and free area detection are also described. This system uses edge-based object border detection for detecting the left, right, lower and upper border of an object.

Document US 2004/0178945 A1 describes an object location system for a road vehicle, which system uses radar means for detecting vehicles and a camera for extracting properties of the detected objects.

SUMMARY

The object of the present invention is to provide a method and a system for improving the detection results of an object position sensor like a radar sensor.

This object is achieved by the features of the independent claims. Advantageous further developments of the invention are the subject-matter of the dependent claims.

A first aspect of the invention refers to a method for detecting the position of a target object in the environment of a host vehicle, comprising the following steps:
- receiving a first position of the target object as detected by an object position sensor like e.g. a radar sensor,
- receiving an image containing the target object as detected by an image sensor like e.g. a camera,
- projecting the first position on the image, and
- refining the first position by computing a second position of the target object on the basis of a symmetry search within the image.

A further aspect of the invention refers to a device for detecting the position of a target object in the environment of a host vehicle, the device comprising:
- means for receiving a first position of the target object as detected by an object position sensor like e.g. a radar sensor,
- means for receiving an image containing the target object as detected by an image sensor like e.g. a camera,
- means for projecting the first position on the image, and
- means for refining the first position by computing a second position of the target object on the basis of a symmetry search within the image.

A still further aspect of the invention refers to a system for detecting the position of a target object in the environment of a host vehicle, the system comprising:
- an object position sensor, for example a radar sensor, for detecting a first position of the target object,
- an image sensor, for example a camera, for detecting an image containing the target object,
- a device for projecting the first position on the image, and for refining the first position by computing a second position of the target object on the basis of a symmetry search within the image.

A still further aspect of the invention refers to a land, air or sea vehicle, preferably a car or motorcycle, being provided with such a system. The system may output a signal being fed to acoustic and/or visual indicating means of the car and or actuators of the vehicle (steering, braking, accelerator, . . . ).

Preferably, the first position and the second position are lateral positions of the target object preferably reflecting the angle or the direction to the target vehicle relative to the host vehicle.

Preferably, the symmetry search consists in identifying a symmetry axis of the target object.

Preferably, the symmetry search is performed within a preferably horizontal symmetry search area, the symmetry search area being located in the image in accordance with the first position and being preferably centered on the first position.

Preferably, a symmetry window, which size preferably corresponds to the size of the target object, is positioned within the symmetry search area, and a correlation value is computed between the content of the symmetry window and the mirrored content of the symmetry window.

Thereby a correlation value can be computed for different positions of the symmetry window within symmetry search area. At least one peak can be detected among the computed correlation values.

The symmetry search can be performed by horizontally folding the symmetry window with its mirrored image using a locally normalizing cost function as a similarity measure for calculating a symmetry value for each position of the symmetry window.

Preferably, it is evaluated if the target object is partly or fully occluded in the image, preferably by projecting onto the image the position of other objects detected by the object position sensor and evaluating potential occlusion by means of the distance of the hypotheses to the host vehicle.

Preferably, the symmetry search is governed by at least one consistency check for preventing an erroneous refining of the first position.

A consistency check can evaluate if the symmetry search leads to multiple valid solutions, e.g. to multiple symmetry peaks, for the second position.

Preferably, a symmetry peak obtained via the symmetry search is not taken into account for refining the first position if the symmetry peak is below a given threshold, or if the region around the symmetry peak and above the given threshold is wider than a give fraction of the expected width of the target object.

Preferably, detected symmetry peaks have to further pass a consistency check that evaluates the past position of theses peaks.

Preferably, the position of a detected symmetry peak can be stabilized by computing a locally weighted mean around the symmetry peak.

Preferably, the second position is incorporated into a Kalman filter for tracking the detected position over time for a spatio-temporal stabilization.

Preferably, the first position or the second position is incorporated into a Kalman filter, the noise parameters of the Kalman filter being dynamically adapted to a low noise configuration in case the second position is processed by the Kalman filter, or to a higher noise configuration in case the first position is processed by the Kalman filter e.g. because the position refining failed.

The idea of the invention is to improve the positioning of objects like vehicles detected by a radar sensor using computer vision methods, especially symmetry based positioning. The invention targets at improving the estimated lateral position of vehicles detected by a radar sensor.

Advantageously, the invention relates to an intelligent vehicle that is equipped with a camera and a radar device. Usually the radar detections have an insufficient lateral precision. Thus this invention uses the additional camera image for a lateral position improvement.

Advantageously, a symmetry detection is applied to the camera image for finding the correct lateral position of a radar detection. For the symmetry filtering first the filter size is defined by means of the distance (which is available from the radar data) of the detection and the known average width of a vehicle. This filter is then applied to an image search area that preferably corresponds to the width of the vehicle, starting from the position detected by the radar. Thus this search area encompasses the whole area that is defined by the precision limit of the radar's lateral position. The maximal response position is regarded as the real lateral position.

This works advantageously with a normalized symmetry detection based on summed normalized cross-correlation (SNCC), rank transform or census transform because these methods locally equalize the error which strongly reduces the effect of outliers.

The symmetry used for improving the estimated lateral position of vehicles detected by a radar sensor shows particularly good results when the object is fully visible or at least when the object is not occluded above a given ratio. Hence, it may be advantageous to provide an additional consistency check for evaluating the found peak (maximal symmetry response) and smoothing the detection over time.

In other words, the proposed invention aims at solving the problem of inaccurate lateral position detection by improving the measurement of the position instead of applying strong temporal filtering using e.g. a Kalman filter.

The position measured by the radar sensor is projected to the image space of a camera, also mounted at the host vehicle, and is therein refined using a symmetry detection method. This method is qualified to improve the position, because a vehicle usually has a strong symmetry along the lateral axis. Using the symmetry detection method, a robust interest point can be found on the detected vehicle and, by projecting back the found interest point to 3D space, a more accurate lateral position of the detected vehicle can be given, making a strong temporal filtering superfluous.

BRIEF DESCRIPTION OF THE DRAWINGS

The invention is to be explained further in the following with reference to the accompanying drawings, wherein.

DETAILED DESCRIPTION

Figure 1:
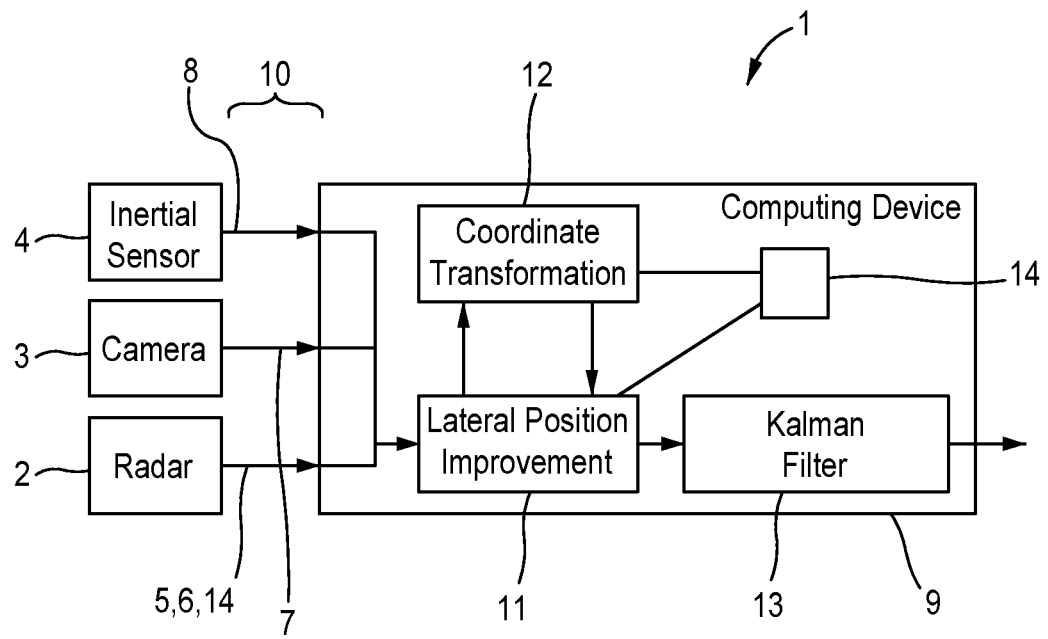
FIG. 1 is a block diagram illustrating the system according to an embodiment of the present invention.

FIG. 1 shows a system 1 according to an embodiment of the invention. The proposed system comprises a radar sensor 2, a camera 3, an inertial sensor (measuring translational and rotary accelerations of the vehicle) 4 and a computing device 9.

Figure 10:
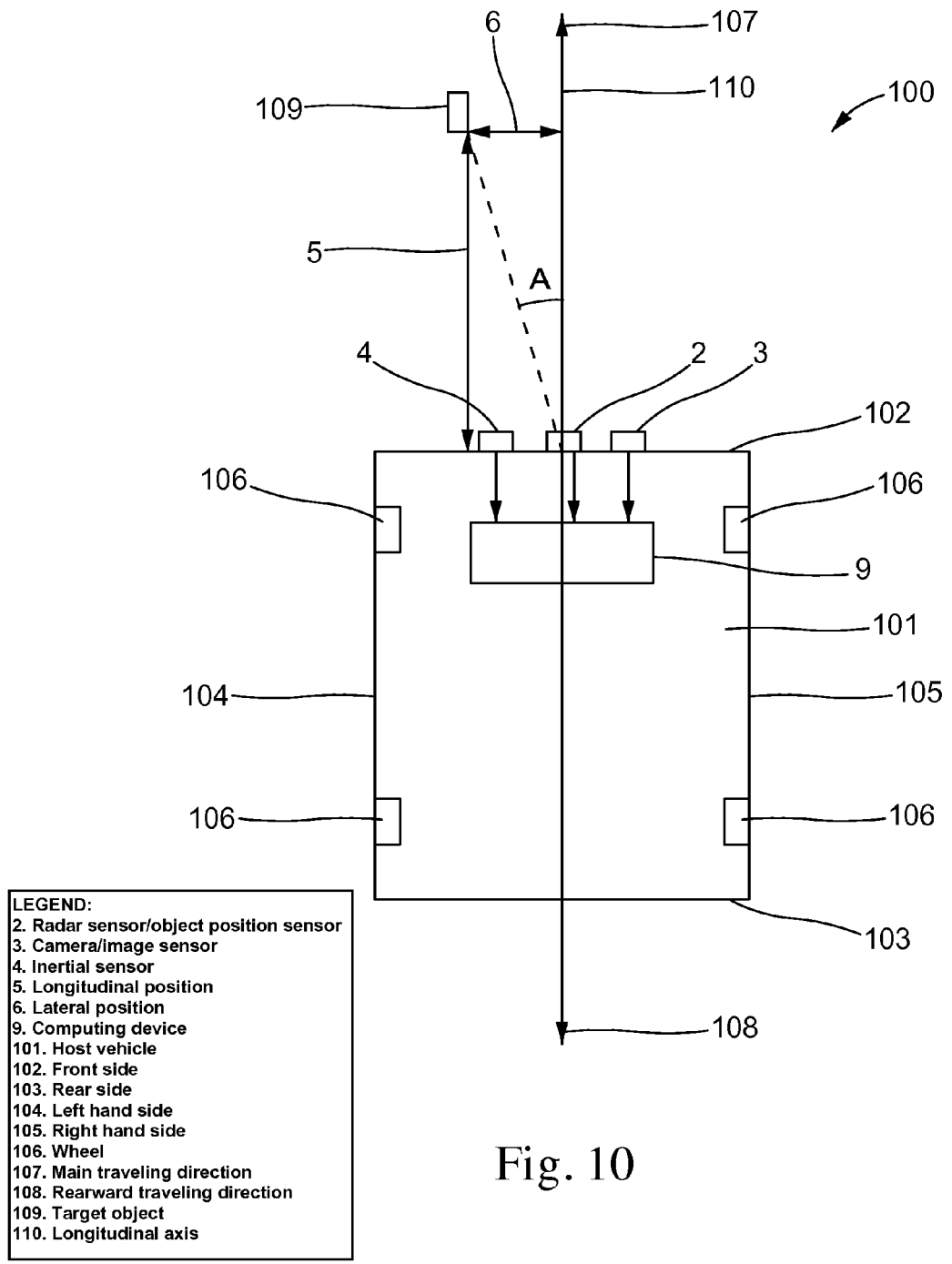
FIG. 10 is a schematic view of an embodiment of the present invention.

FIG. 10 shows a top view or bird's eye view of an embodiment 100 of the present invention. The radar sensor 2, the camera 3, the inertial sensor 4 and the computing device 9 are preferably mounted on a host vehicle 101 ("ego-vehicle").

The host vehicle 101 can be any land, air, or see vehicle as well as any combination thereof. The invention can e.g. be used with a car, a motorcycle or a scooter. The host vehicle 101 of the embodiment 100 of FIG. 10 is preferably a car 101. Said host vehicle 101 has a front side 102, a rear side 103 as well as lateral sides that are a left hand side 104 and a right hand side 105. The car comprises preferably four wheels 106.

Reference 107 is an arrow identifying the main travelling direction of the vehicle 101. The main travelling direction is preferably the forward motion. The opposite direction to the main travelling direction preferably corresponds to a rearward travelling direction 108. The host vehicle 101 preferably presents a longitudinal axis 110 extending from the front side 102 to the rear side 103. The longitudinal axis 110 can preferably be an axis of symmetry of the host vehicle. As shown in FIG. 10, the main travelling direction 107 and rearward travelling direction 108 are parallel to the longitudinal axis 110.

The radar sensor 2 is mounted on the host vehicle 101 so as to be able to detect other vehicles or traffic objects (pedestrians, . . . ) around, and particularly in the vicinity of, the host vehicle. An object detected by the radar sensor 2 is referred to as a target object 109. In FIG. 10, the target object 109 is a vehicle being ahead of the host vehicle 101 relative to the main travelling direction 107. The schematic view of FIG. 10 is not true to scale. The down-scaled target object 109 e.g. illustrates a distant target object.

The radar sensor 2 provides data about the relative position of such a target object 109 to the host vehicle 101 and to the radar sensor 2. The position data are defined with respect to the coordinate system of the radar sensor 2 or with respect to the coordinate system of the host vehicle. The position can comprise a (relative) longitudinal position 5 and a (relative) lateral position 6. The terms "longitudinal" can be defined in relation to the main traveling direction 107 of the host vehicle, or the longitudinal axis 110 of the host vehicle, especially in case of a standing host vehicle. The "lateral position" can thus refer to the distance of the target object to the traveling axis of the host vehicle. In the embodiment of FIG. 10, the longitudinal position 5 corresponds to the distance between the host vehicle 101 or the radar 2 and the projection of the target vehicle 109 on the longitudinal axis 110, the lateral position 6 then corresponding to the distance between target vehicle 109 and longitudinal axis 110.

The radar sensor 2 may also detect the speed 14 of the target vehicle or object, in addition to the relative position. Methods for detecting said speed 14 are well-known in the art.

The radar sensor 2 is part of a particular embodiment of the invention. More generally, the invention makes use of an object position sensor for determining a longitudinal position 5 and a lateral position 6 of the target vehicle. The object position sensor typically comprises a transmitter that emits waves. The waves are then scattered or reflected by the target vehicle. A receiver of the object position sensor is adapted to receive the waves that are reflected back by the target vehicle. The received waves are processed according to known techniques in order to determine said longitudinal position 5 and lateral position 6 of the target vehicle or object within the coordinate system of the object position sensor.

Beside the radar sensor 2, which uses radio waves to determine the position of the target vehicle, the system 1 can alternatively or in addition thereto comprise another object position sensor like a lidar, also called laser radar, an ultrasonic sensor or a sonar. The lidar emits a laser, the ultrasonic sensor emits sound waves in the ultrasonic range, and the sonar emits sound waves that can range from infrasonic to ultrasonic frequencies.

The longitudinal position 5 advantageously corresponds to the detected distance from the radar 2 to the target vehicle (in case the radar beam is parallel to the traveling direction of the host vehicle), and the lateral position 6 is reflected by the angle A or the direction (relative to the traveling direction 107 of the host vehicle) to the target vehicle. The longitudinal position 5 and the angle A are shown in FIG. 10.

The above-mentioned longitudinal position 5 can be the position along the longitudinal axis 110 passing through the radar 2 or, more generally, passing through the system or the host vehicle 101 on which the system 1 is mounted. The lateral position 6 can correspond to the position along an axis perpendicular to said longitudinal axis 110. The longitudinal axis preferably corresponds to the main axis of the radar beam or to the main axis of the radar beams. According to a preferred embodiment, the radar 2 is mounted on the host vehicle so that the longitudinal position 5 is the position along the front-rear axis of the host vehicle or along the symmetry axis of the host vehicle.

In any case, the device 9 comprises a coordinate transformation module 12 shown in FIG. 1 for transforming position data between the coordinate system of the radar sensor 2 and the coordinate system of the host vehicle 101. The coordinate system of the host vehicle 101 is preferably a orthogonal coordinate system defined by the longitudinal axis 110.

The camera 3, or more generally the image sensor 3, is a known device that is adapted to capture images 7 of the surroundings of the host vehicle. The camera 3 may capture a single image or a succession of images forming the successive frames of a video.

The radar 2 and the camera 3 are mounted on the host vehicle in such a way that both of their sensing areas are mostly overlapping. A higher overlap implies a higher possibility of improving the positioning of the target vehicle detected by the radar sensor.

The axis of symmetry of the radar beam/beams and the camera input field are preferably parallel, more preferred co-parallel. In the embodiment 101 of FIG. 10, the detection axis of the radar 2 is parallel to the detection axis of the camera 3.

The radar sensor 2 and the camera 3 are preferably mounted in the front area of the host vehicle in order to detect the position of a target vehicle or object ahead of the host vehicle. In such a case, the longitudinal position 5 and the lateral position 6 advantageously correspond to the longitudinal and lateral axes of the host vehicle.

Alternatively, the radar sensor 2 and the camera 3 can be positioned on the rear side 103 or in a rear or lateral area of the host vehicle. Their sensing direction would thus allow the detection of a target vehicle or object located respectively behind the host vehicle or along the lateral axis of the host vehicle. Radar sensor 2 and camera 3 can also be positioned on the left hand side 104 or right hand side 105 of the host vehicle.

The inertial sensor 4 is fixedly attached to the host vehicle and is adapted to generate data 8 relative to the speed (derived from by integrating the acceleration detection performed by this sensor) of the host vehicle. Said data 8 are transmitted to the computing device 9 via e.g. a dedicated line. The inertial sensor 4 can comprise a motion sensor in form of an accelerometer for determining the speed of the host vehicle. Advantageously, the inertial sensor 4 further comprises a rotation sensor like a gyroscope so that the velocity, i.e. the direction and the speed of movement, of the host vehicle can be detected by the computing device 9.

The system 1 of FIG. 1 further comprises a bus 10 for transmitting the sensed data to the computing device 9. The bus is preferably a CAN bus or controller area network bus, which is usually used for connecting components inside a vehicle. The bus 10 connects the radar 2, the camera 3 and the inertial sensor 4 to computing device 9. The computing device 9 receives via this bus 10 information about objects detected by the radar sensor 2 such as the longitudinal position 5 and the lateral position 6, information about the host vehicle such as its speed 8, and an image 7 or a sequence of images captured by the camera 3. Alternatively, dedicated transmission lines can be provided for transmitting the sensed data to the computing device 9.

The block diagram of FIG. 1 shows three units or modules of the computing device 9: the lateral position improvement module 11, the coordinate transformation module 12, and the Kalman filter module 13.

The lateral position improvement module 11 receives lateral and longitudinal positions 5, 6 of objects detected by the radar sensor 2, the camera image 7 corresponding to the radar time frame, and the host vehicle speed 8. The lateral position improvement module estimates a more accurate lateral position of the objects than the lateral position 6 given by the radar 2.

This lateral position improvement module 11 is adapted to find symmetry axes of the objects in the camera images 7 based on the rough positions detected by the radar 2.

The coordinate transformation module 12 is used to convert positions between the radar and the image coordinate system. This process is governed by parameters that are acquired by a calibration of radar 2 and camera 3.

The Kalman filter module 13 estimates the object position, velocity and acceleration from the measurements of the radar 2, the inertial sensor 4 and the lateral position improvement, using the well-known Kalman filter approach to produce statistically optimal estimates.

Figure 2:
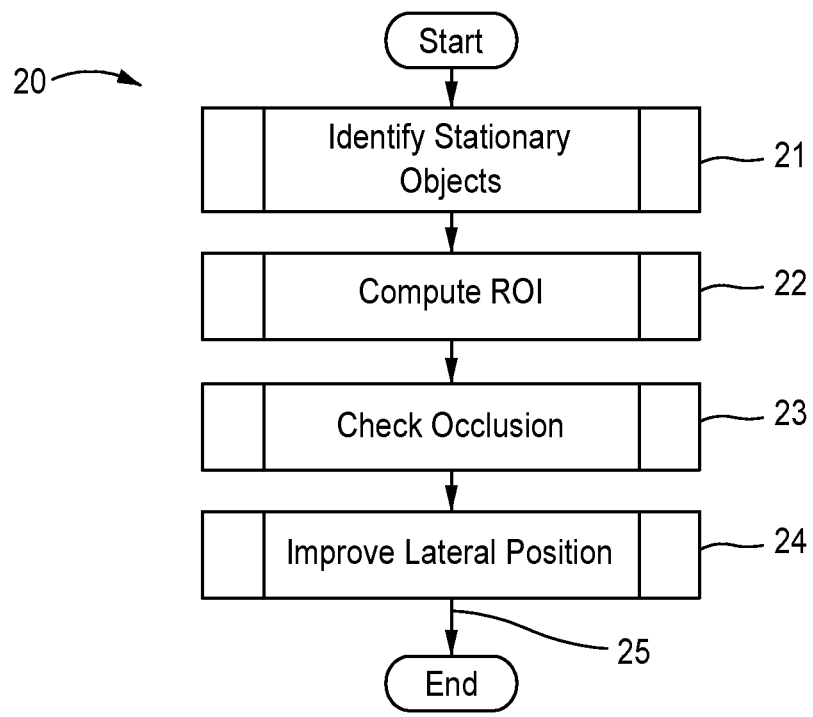
FIG. 2 is a flowchart of a method for detecting a position according to an embodiment of the present invention.

FIG. 2 is a flowchart of the method steps carried out by the lateral position improvement module 11.

The method 20 comprises a first step consisting in identifying stationary objects 21. Each object detected by the radar 2 is classifies as a moving object or as a stationary object. This step is optional.

This method step can be used for identifying moving or stationary objects. This step can be carried out e.g. if the only objects that should be identified and processed are non-stationary i.e. non-static objects like moving vehicles. Other elements in the environment of the host vehicle like houses or trees will automatically be disregarded.

On the other hand, this method step can consist in identifying moving or stationary objects with respect to the host vehicle, e.g. so as to select only vehicles driving with a speed similar to the speed of the host vehicle and into the same direction as the host vehicle. A typical scenario is the identification of the vehicle or vehicles driving ahead or behind the host vehicle.

Static objects are indentified by comparing their speed relative to the host vehicle with the speed of the host vehicle. An object is considered static if its speed is comparable to the speed of the host vehicle but in the opposite direction. This means that objects are considered static if the absolute difference of the speed of the object relative to the host vehicle and the speed of the host vehicle is below a given threshold, e.g. below 20 km/h, below 10 km/h or below 5 km/h. The speed of the host vehicle, as detected by the inertial sensor 4, and/or the speed of the object 14, as detected by the radar 2, can be taken into account for the identification of stationary objects.

Next, a region corresponding to the object detected by the radar 2 and advantageously categorized 21 as being stationary object with respect to the host vehicle is identified on the image 7 from the camera. A region called region of interest (ROI) is computed for each radar detected object at the compute region of interest step 22. The region of interest has a predefined size and shape corresponding to the object to be detected. The size of the region of interest is representative of the object that is expected to be identified.

The objects to be detected are preferably vehicles. In case of vehicle identification, the region of interest can preferably be rectangular with a predefined width and height reflecting typical vehicle values. As an example, a width of 1.8 m and a height of 1.4 m can be chosen.

Figure 3:
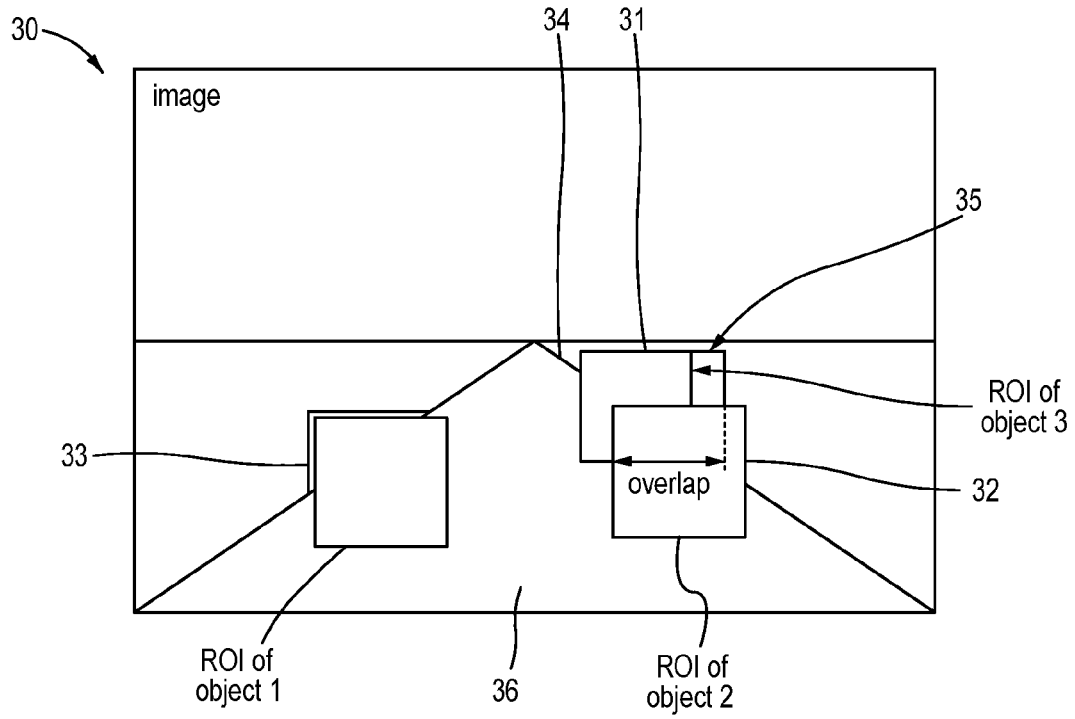
FIG. 3 shows the image processing according to particular aspects of the invention.

FIG. 3 shows three regions of interest 31, 32, 33 of three objects detected by the radar. As can be seen in FIG. 3, the size of the region of interest is scaled down depending on the longitudinal position 5 of the object. The region of interest 31 is inserted in the image 7 on the location defined by the position 5, 6 detected by the radar 2.

The object position detected by the radar 2 defined by the longitudinal position 5 and the lateral position 6 is projected on the image space of the camera 3. The relative mount position of the radar 2 with respect to the camera 3, or the relative position of the sensing areas of radar and camera, is thereby taken into account for projecting a position detected by the radar 2 onto an image 7 from the camera 3. The region of interest is also computed on the basis of camera calibration parameters.

The coordinate transformation module 12 is used for computing the region of interest in an image 7 corresponding to the object in metric space. The data reflecting said relative mount position or said relative sensing area position, as well as the calibration parameters of the camera are preferably stored in a storing unit 14 of the computing device 9.

In the check occlusion step 23 of the lateral position improvement method 20, it is checked if a detected object is occluded or hidden by any other object. The occlusion for an object can be checked as follows. Taking a rectangular region that consists of the region of interest of an object plus an additional margin to the left and to the right, it is checked if this region overlaps with a region of interest of any other object that is closer to the host vehicle than the object under consideration. In such a case, the object is identified as occluded.

FIG. 3 illustrates the occlusion check step 23. FIG. 3 shows an image 30 consisting in the image 7 sensed by the camera and the regions of interest 31, 32, 33 of objects detected by the radar 2. For determining a possible occlusion of the object corresponding to the region of interest 31, said region of interest 31 is extended on the left by a left margin 34 and on the right by a right margin 35 to form an occlusion check region 36.

Two regions of interest 32, 33 are identified as being closer to the host vehicle than the object under consideration. The region of interest 33 does not overlap the occlusion check region 36. On the contrary, the occlusion check region 36 overlaps with the region of interest 32. Therefore the object linked with said occlusion check region 36 is identified as an occluded object.

Additionally, the percentage of overlapping can be determined by e.g. calculated the proportion of the occlusion check region 36 that is hidden or occluded by said closer regions of interest 32, 33. Objects having an occlusion check region 36 that is at least partially occluded by other regions of interests 32, 33 are preferably not processed further. Advantageously, the method 20 is not carried out further for objects with an occlusion check region 36 presenting a percentage of overlapping above a given threshold, e.g. above 10%, 20% or 50%.

Figure 4:
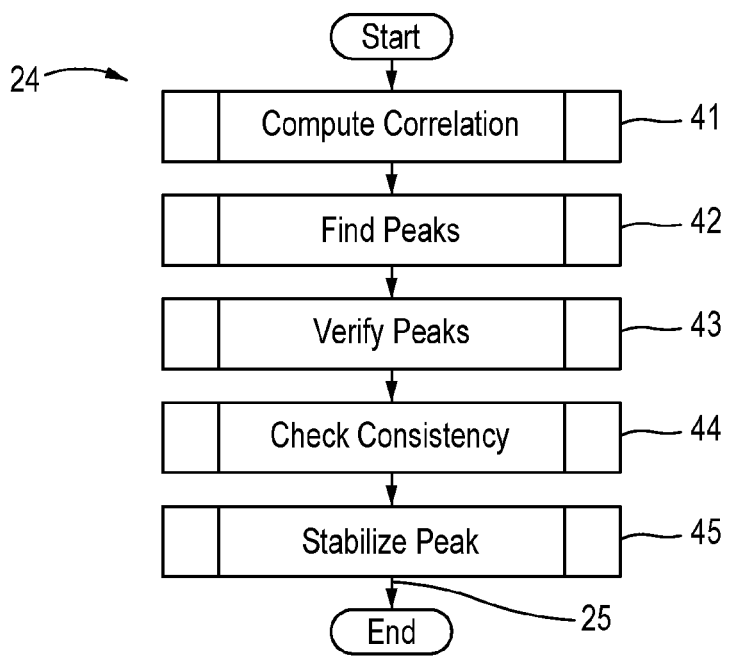
FIG. 4 is a flowchart of a method for improving the lateral position according to an embodiment of the present invention.

The improve lateral position step 24 is detailed in FIG. 4. This step is preferably executed for every non-static and non-occluded 23 object located within the pre-defined position range.

Figure 5:
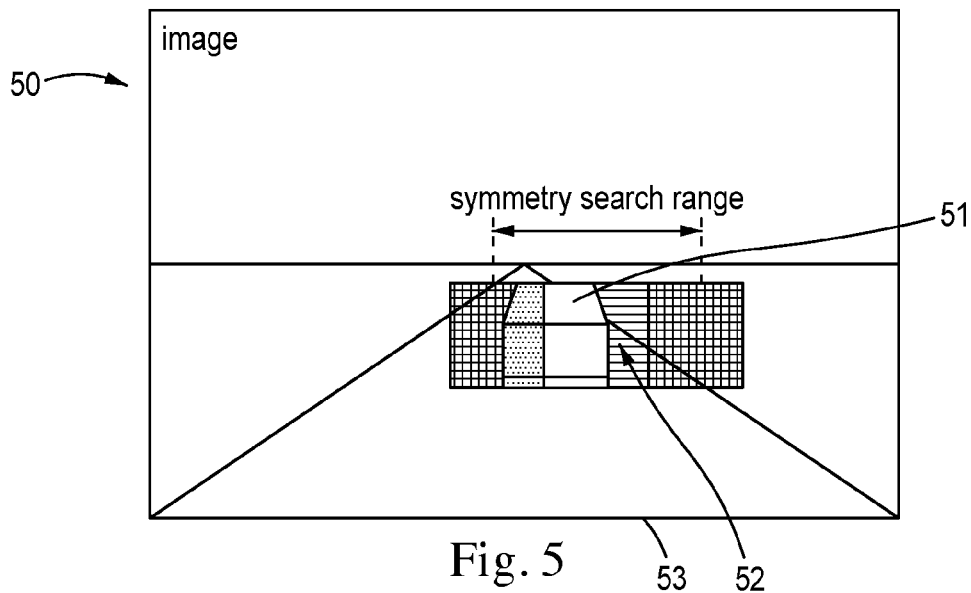
FIG. 5 illustrates the symmetry search according to a particular embodiment of the invention.

At the compute correlation step 41, first, a symmetry search area 53 in an image 50 is determined. The symmetry search area 53 for an object 51 is an extension of its region of interest 52. Preferably and as shown in FIG. 5, the symmetry search area 53 is obtained by extending the region of interest 52 to the left and to the right by a pre-defined ratio. In the embodiment of FIG. 5, the search range, i.e. the symmetry search area 53, is three times as wide as the region of interest 52 of the object 51.

Figure 6:
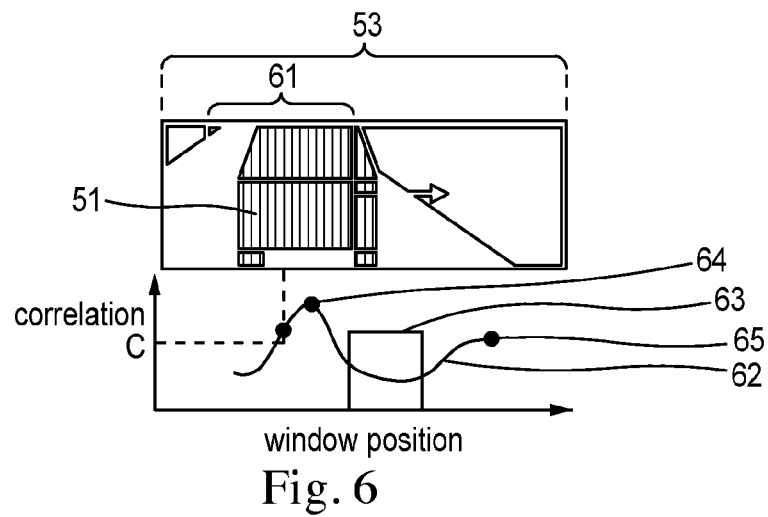
FIG. 6 shows further aspects of the symmetry search according to a particular embodiment of the invention.

Then a symmetry window 61, shown in FIG. 6, of the same size as the region of interest 52 is placed in the symmetry search area 53. A correlation between the image clipped by the symmetry window 61 and its left-right flipped copy is computed 41. For each position of the symmetry window 61 within the symmetry search area 53, the image located in said symmetry window 61 is correlated with its vertical symmetrical, i.e. with its left-right mirrored image.

A correlation value C is computed for each position of the symmetry window 61 as it is swept over the symmetry search area 53. Depending on the desired accuracy for the lateral position, the correlation value C may not be computed for each position of the symmetry window 61. Rather the correlation value C may only be calculated for discrete, e.g. regularly spaced, positions of the symmetry window 61 within the symmetry search area 53.

A high correlation value is expected when the image inside the symmetry window 61 is left-right symmetric.

The methods for performing the correlation are well-known in the art. Preferably the correlation measure is based on any of the following locally normalizing cost functions:
- normalized cross-correlation (NCC),
- summed normalized cross-correlation (SNCC), also known as summed normalized correlation,
- local mean and variance normalized images with sum of absolute difference (SAD) or with sum of squared difference (SSD),
- rank transformed images with sum of absolute difference (SAD) or with sum of squared difference (SSD), or
- census transformed images with Hamming distance.

The normalized cross-correlation (NCC) is a standard matching cost function in the domain of stereo disparity computation that is robust against a bias and a linear gain of pixel intensities. For two patches from two images $I^L$ and $I^R$ the normalized cross-correlation (NCC) is defined as:

$$\rho_x = \frac{\frac{1}{|p(x)|} \sum_{x' \in p(x)} (I_{x'}^L - \mu_x^L)(I_{x'+d}^R - \mu_{x+d}^R)}{\sigma_x^L \sigma_{x+d}^R}, \quad (1)$$

where $$\mu_x = \frac{1}{|p(x)|} \sum_{x' \in p(x)} I_{x'}, \; \sigma_x = \sqrt{\frac{1}{|p(x)|} \sum_{x' \in p(x)} (I_{x'} - \mu_x)^2}. \quad (2)$$

In the above equations x is the pixel position of the anchor point of the left patch, p(x) is the set of pixel coordinates of the left image patch and p(x+d) is the set of pixel coordinates of the right image patch, i.e. d denotes the disparity between the left and right image patch. Furthermore, |p(x)| is the number of elements of p(x).

Figure 8:
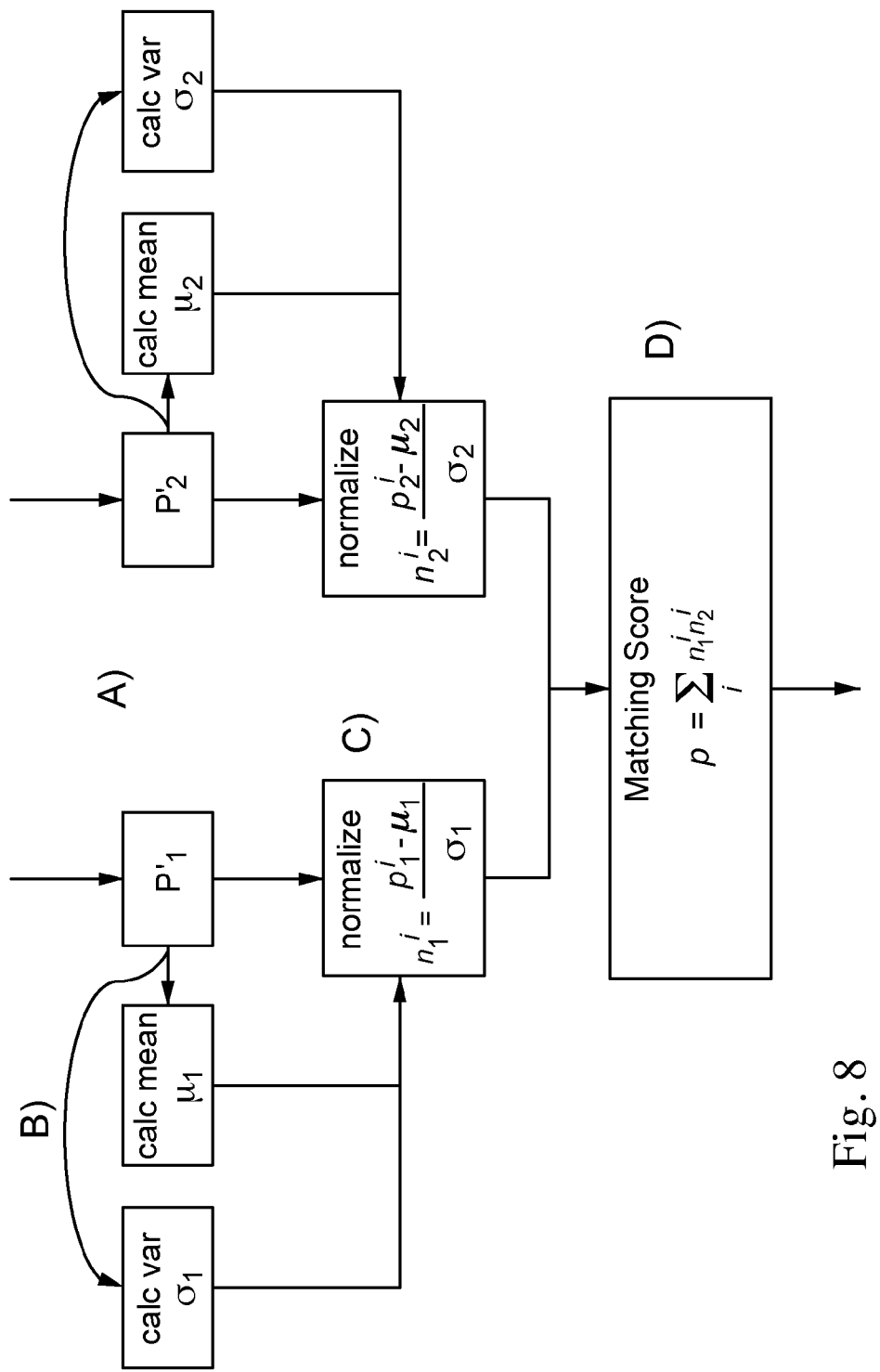
FIG. 8 shows the processing flow of a normalized cross-correlation (NCC)

FIG. 8 shows the processing flow of NCC for two image patches P1 and P2. First the mean and standard deviation is calculated for each patch. Then the patch values are normalized using mean and standard deviation. Finally, a matching score is computed.

Preferably, the summed normalized correlation (SNCC) is used for the correlation measure. The summed normalized correlation is disclosed e.g. in the document "A two-stage correlation method for stereoscopic depth estimation", Einecke, N. and Eggert, J. (2010), in Proceedings of the International Conference on Digital Image Computing: Techniques and Applications (DICTA), pages 227-234, or in the document EP 2386998 A1. These documents are hereby incorporated by reference.

The summed normalized correlation (SNCC) is a cost function for image correlation computation. It is a two-stage filtering that performs a normalized cross-correlation (NCC) with a very small filter in the first stage and aggregates the resulting correlation coefficients in the second stage.

Figure 9:
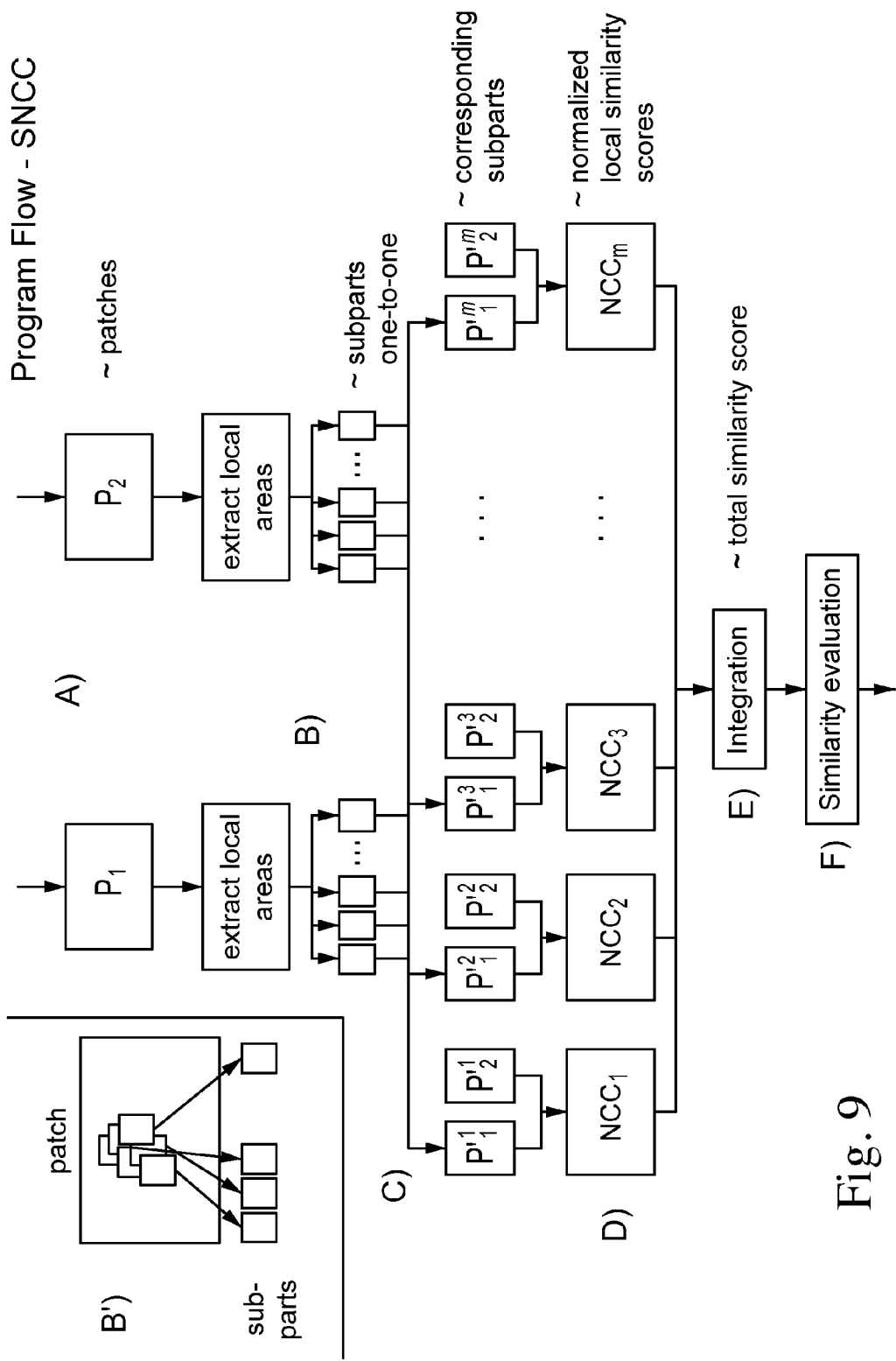
FIG. 9 shows the processing flow of a summed normalized cross-correlation (SNCC)

The summed normalized cross-correlation (SNCC) is shown in FIG. 9. In a first step, the image patches (A) are divided into subparts (B). As is depicted in the inset (B') at the upper left of FIG. 9 these subparts may also overlap. Furthermore, the two patches are subdivided in an analogous way, so that each subpart in one patch has a corresponding subpart in the other patch (C). In a second step, each corresponding subpart pair is passed toward the NCC calculation (D). Each NCC box in FIG. 9 can be replaced by the scheme shown in FIG. 8. This leads to local similarity scores for each subpart pair. These scores are integrated into a total matching score in a third step (E), which finally leads to the similarity evaluation (F).

Alternatively and as mentioned above, the correlation measure can be based on a known local mean and variance normalization together with the known methods sum of absolute difference (SAD) or sum of squared difference (SSD). The sum of absolute difference (SAD) is e.g. an algorithm for measuring the similarity between image blocks. It works by taking the absolute difference between each pixel in the original block and the corresponding pixel in the block being used for comparison. These differences are summed to create a simple metric of block similarity.

The above-mentioned "rank transform" cost function for correlation is based on the idea of replacing each pixel intensity with its rank among a certain neighborhood. This removes most of the lighting changes that can occur between images. The actual rank transform is only a preprocessing of the images, which is usually followed by a further computation with sum of absolute difference (SAD) or sum of squared difference (SSD).

The "census transform" cost function is an extension of the rank transform which does not replace the pixels with their rank but rather a binary fingerprint that encodes which pixels of the neighborhood are smaller than an anchor pixel. The matching cost here is the Hamming distance between two such finger prints.

The rank transform and census transform are further described in Zabih, R. and Woodfill, J. (1994). Non-parametric local transforms for computing visual correspondence. In Proceedings of Third European Conference on Computer Vision (ECCV), pages 151-158. This document is hereby incorporated by reference.

Alternatively, the symmetry search may also be performed in the frequency domain, e.g. via a phase only correlation (POC). The phase only correlation is used to compute horizontal shifts between the content of the symmetry window 61 and its vertical mirrored image. Both the content of the symmetry window 61 and its mirrored image are made up of pixels arrayed in a mesh-like pattern. According to the phase only correlation, for the image defined by the symmetry window 61 and for its mirrored image, pixel information patterns of all meshes are separately subjected to a Fourier transformation. Then, a phase-only processing is carried out on the Fourier transformation plane in order to determine a matching point between both the patterns.

After the compute correlation step 41, a find peaks step 42 is performed for finding peaks in the computed correlation curve 62. These peaks are potential candidates for the symmetry axis of the object 51. By sweeping a search window 63 over the correlation curve 62, all candidate peaks are indentified. A peak is found when the correlation at the center of the search window 63 is the maximum within the whole search window 63. The size of the search window 63 is a certain ratio of the region of interest 52. In the present embodiment it is half of the region of interest width. As a matter of fact, multiple peaks may be found in this step: FIG. 6 shows an embodiment with a correlation curve 62 having two peaks 64, 65.

Figures 7A, 7B, 7C:
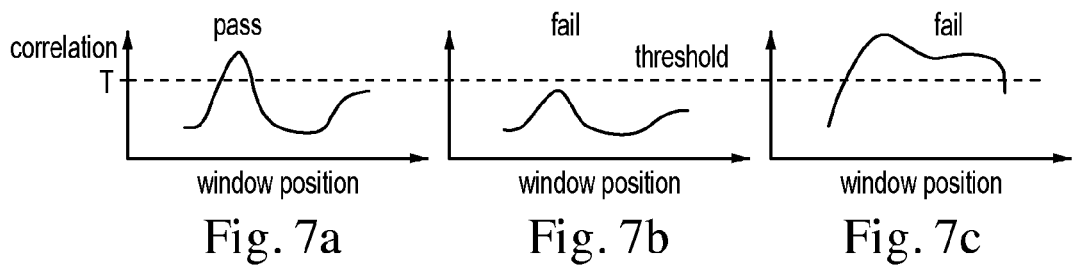
FIGS. 7a, 7b and 7c illustrates the identification of peaks within a correlation curve of the present invention.

Each of these peaks 64, 65 is verified in the verify peaks step 43, which is illustrated in FIGS. 7a, 7b and 7c. The verification is performed with the following two criteria.

First, the correlation at the peak 64, 65 has to be greater than a threshold T. Second, the segment of the correlation curve that contains the peak 64, 65 and is above the threshold is narrower than a certain ratio of the ROI width. In a particular embodiment, the ratio can be 1.5.

FIGS. 7a, 7b and 7c show some typical correlation curves to visualize the above criteria. The first criterion verifies that the confidence of a symmetry peak is high enough, and the second criterion is to remove peaks that are due to poor texture. Peaks that fail these criteria are removed from the list of peaks. Peaks are removed from the list of peaks preferably if they do not meet these two criteria. Alternatively, they are removed if only one of the two criteria is not fulfilled.

FIG. 7a shows an embodiment with both criteria being fulfilled. In FIG. 7b the first criterion is not met because no peak is above the predetermined threshold T. In FIG. 7c the second criterion is not fulfilled.

If no peak remains after the verify peaks step 43, then the lateral position of the object is not updated or corrected, but the lateral position 6 measured by the radar 2 is used instead.

The following check consistency step 44 checks if peaks are consistent with the past positions of the object 51. To this end, the lateral positions of the peaks in an image are converted back to lateral positions in the radar coordinate system using the coordinate transformation module 12. Then the median of the lateral positions in the last time frames are computed and the lateral position of the peak closest to the median is determined. For example, the last five time frames can be used to compute the median. If the difference between the median and the closest lateral position is less than a threshold then the peak passes into the next step, otherwise the consistency of the lateral position of the peaks are processed further. Those remaining peaks are checked with the following criteria: the lateral position of the peak which is closest to the last lateral position updated by this module is determined, and it passes into the next step if their difference is less than a threshold. In case that the last position was not updated in this module or the difference is larger than a threshold, the lateral position of the object is not updated, but its radar position 6 is used instead.

The stabilize peak step 45 is performed to avoid jitter in the lateral position. The weighted mean of the lateral position around the peak is computed within a certain range centered at the peak, which is a quarter of the region of interest width in a particular embodiment of the invention:

$$x^* = \sum_{x \in N(x^P)} \frac{c(x) \cdot x}{Z}, \quad (3)$$

$$Z = \sum_{x \in N(x^P)} c(x),$$

wherein
x* is the stabilized lateral position in the image, and c(x) is the correlation value at the lateral position x,
$x^P$ is the lateral position of the peak, and
$N(x^P)$ is the range centered at $x^P$.

This way, the lateral position becomes stable over time especially in the case where a few peaks in similar height appear close by and the maximum frequently switches among them. The stabilized lateral position in image coordinates is converted to the radar coordinate by the coordinate transformation module 12, and the lateral position 6 originally estimated by the radar is updated with the refined lateral position 25 in this module.

The system 1 further comprises a Kalman filter module 13. Such a Kalman filter is well known in the art, and is e.g. described in Kalman, R. E. (1960). A new approach to linear filtering and prediction problems. Transactions of the ASME—Journal of Basic Engineering, 82(1):35-45.

The Kalman filter module 13 receives the object's lateral position with a flag indicating whether or not it has been updated in the lateral position improvement module 11. Since noise in the lateral position is expected to be lower when it is updated by the module as compared to the radar lateral position 6, the noise parameters of the Kalman Filter dynamically adapts to the flag or indicator of the source of lateral position.

LIST OF REFERENCE SIGNS 1 system
2 radar sensor/object position sensor
3 camera/image sensor
4 inertial sensor
5 longitudinal position
6 lateral position
7 image from the camera
8 data from the inertial sensor
9 computing device
10 bus
11 lateral position improvement module
12 coordinate transformation module
13 Kalman filter module
14 storing unit
20 method for lateral position improvement
21 identify stationary objects step
22 compute region of interest step
23 check occlusion step
24 improve lateral position step
25 refined lateral position
30 image
31, 32, 33 regions of interest
34 left margin
35 right margin
36 occlusion check region
41 compute correlation step
42 find peaks step
43 verify peaks step
44 check consistency step
50 image
51 object
52 region of interest
53 symmetry search area
61 symmetry window
62 correlation curve
63 search window
64, 65 peaks
100 embodiment of FIG. 10
101 host vehicle
102 front side
103 rear side
104 left hand side
105 right hand side
106 wheel
107 main travelling direction
108 rearward travelling direction
109 target object
110 longitudinal axis

The invention claimed is:
1. A method for detecting the position of a target object in the environment of a host vehicle, comprising the following steps:
receiving a first position information on the target object using an object position sensor which emits waves and receives the waves that are reflected back by the target object,
  receiving an image containing the target object as detected by an image sensor,
  projecting the first position on the image, and
  refining the first position by computing a second refined position of the target object on the basis of a symmetry search within the image,
  wherein the symmetry search is performed within a horizontal symmetry search area, the symmetry search area being located in the image in accordance with the first position, centered on the first position and being defined based on a precision limit of the object position sensor.

2. The method according to claim 1,
  wherein the first position and the second position are lateral positions of the target object preferably reflecting the angle or the direction to the target vehicle with respect to the host vehicle.

3. The method according to claim 1,
  wherein the symmetry search consists in identifying a symmetry axis of the detected image of the target object.

4. The method according to claim 1,
  wherein a symmetry window, which size preferably corresponds to the size of the target object, is positioned within the symmetry search area, and
  a correlation value is computed between the content of the symmetry window and the mirrored content of the symmetry window.

5. The method of claim 4,
  wherein a correlation value is computed for different positions of the symmetry window within symmetry search area, and
  at least one peak is detected among the computed correlation values.

6. The method according to claim 1,
  wherein the symmetry search is performed by horizontally folding the symmetry window with its mirrored image using a locally normalizing cost function as a similarity measure for calculating a symmetry value for each position of the symmetry window.

7. The method according to claim 6,
  wherein the locally normalizing cost function is the summed normalized cross-correlation (SNCC), local mean and variance normalized (MVN) images with sum of absolute difference (SAD), rank transformed (RT) images with sum of absolute difference (SAD) or census transformed images with Hamming distance.

8. The method according to claim 1,
  wherein the symmetry search is performed in frequency domain according to phase only correlation (POC), to compute horizontal shifts between the symmetry window and its mirrored image.

9. The method according to claim 1,
  wherein the symmetry search area is defined by the distance between host vehicle and target object as detected by the object position sensor, and by an average physical width for the target object.

10. The method according to claim 1,
  wherein the symmetry search area is down sampled to a pre-fixed resolution so that the maximum computational costs per image is bound only by the number of objects and not their distance.

11. The method of claim 1,
  wherein the first position is refined only if the target object is identified as a non-static object, or alternatively the first position is refined depending on the relevance of the target object to the host vehicle.

12. The method of claim 1,
  wherein it is evaluated if the target object is partly or fully occluded in the image, preferably by projecting onto the image the position of other objects detected by the object position sensor and evaluating potential occlusion by means of the distance of the hypotheses to the host vehicle.

13. The method of claim 1,
  wherein the symmetry search is governed by at least one consistency check for preventing an erroneous refining of the first position.

14. The method according to claim 13,
  wherein a consistency check evaluates if the symmetry search leads to multiple valid solutions.

15. The method according to claim 13,
  wherein a symmetry peak obtained via the symmetry search is not taken into account for refining the first position if the symmetry peak is below a given threshold, or if the region around the symmetry peak and above the given threshold is wider than a give fraction of the expected width of the target object.

16. The method according to claim 13,
  wherein detected symmetry peaks have to further pass a consistency check that evaluates the past position of theses peaks.

17. The method of claim 1,
  wherein the position of a detected symmetry peak is stabilized by computing a locally weighted mean around the symmetry peak.

18. The method of claim 1,
  wherein the second position is incorporated into a Kalman filter for tracking the detected position over time for a spatio-temporal stabilization.

19. The method of claim 1,
  wherein the first position or the second position is incorporated into a Kalman filter, the noise parameters of the Kalman filter being dynamically adapted to a low noise configuration in case the second position is processed by the Kalman filter, or to a higher noise configuration in case the first position is processed by the Kalman filter because the position refining failed.

20. An apparatus for detecting the position of a target object in the environment of a host vehicle, the apparatus comprising:
  an object position sensor for detecting a first position of the target object by emitting waves and receiving the waves that are reflected back by the target object,
  an image sensor for generating an image containing the target object,
  a device for projecting the first position on the image, and for refining the first position by computing a second position of the target object on the basis of a symmetry search within the image,
  wherein the symmetry search is performed within a horizontal symmetry search area, the symmetry search area being located in the image in accordance with the first position, centered on the first position and being defined based on a precision limit of the object position sensor.

21. A system for detecting the position of a target object in the environment of a host vehicle, the system comprising:
  an object position sensor for detecting a first position of the target object by emitting waves and receiving the waves that are reflected back by the target object,
  an image sensor for generating an image containing the target object, a device for projecting the first position on the image, and for refining the first position by computing a second position of the target object on the basis of a symmetry search within the image, wherein the symmetry search is performed within a horizontal symmetry search area, the symmetry search area being located in the image in accordance with the first position, centered on the first position and being defined based on a precision limit of the object position sensor.

22. A land, air or sea vehicle, preferably a car or motorcycle, comprising the system of claim 21.

* * * * *